Nov. 25, 1969  H. W. WINTER  3,479,904
TOGGLE LINK MOUNTING MECHANISM
Filed July 12, 1968  5 Sheets-Sheet 1
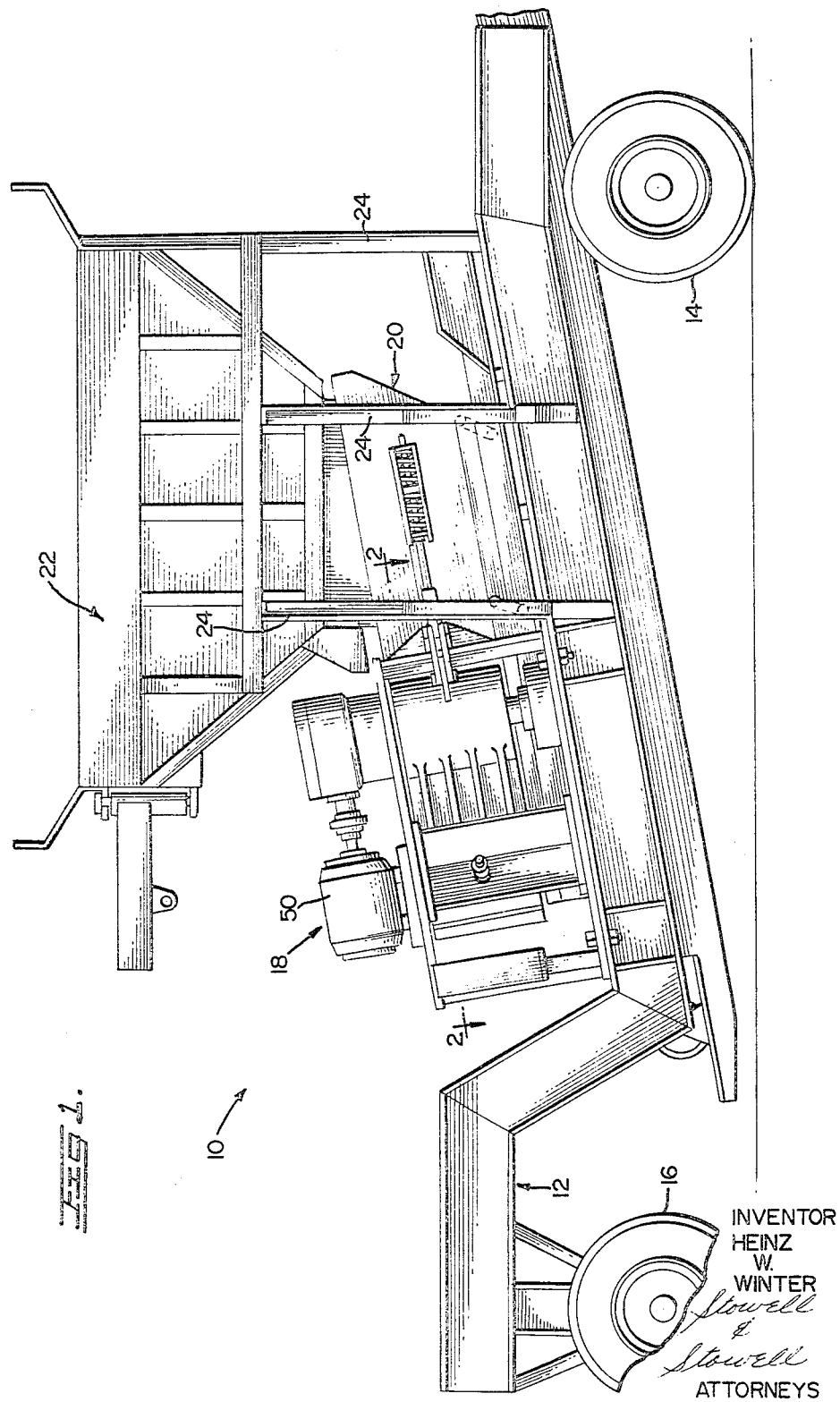
INVENTOR
HEINZ W. WINTER
Stowell & Stowell
ATTORNEYS

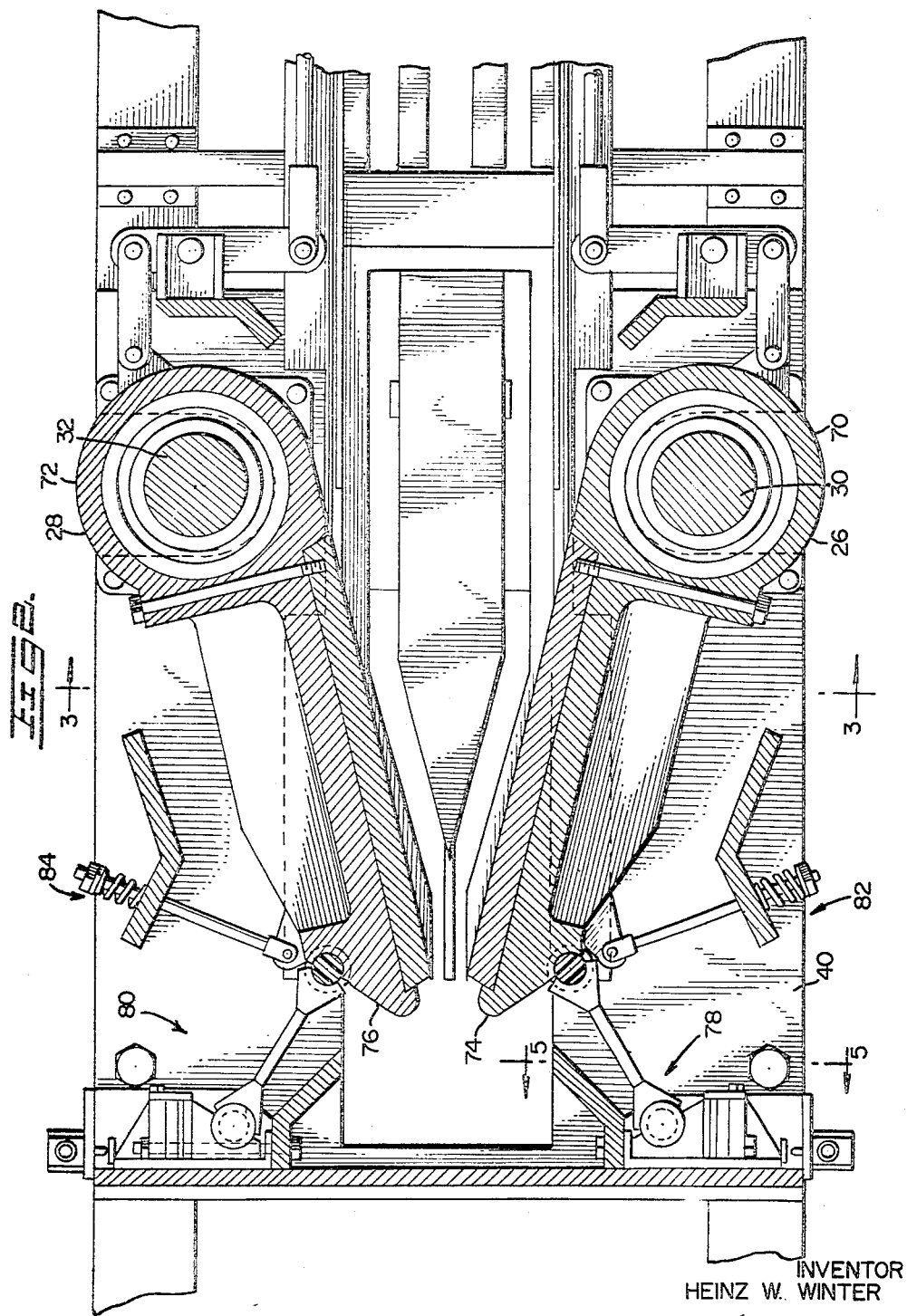

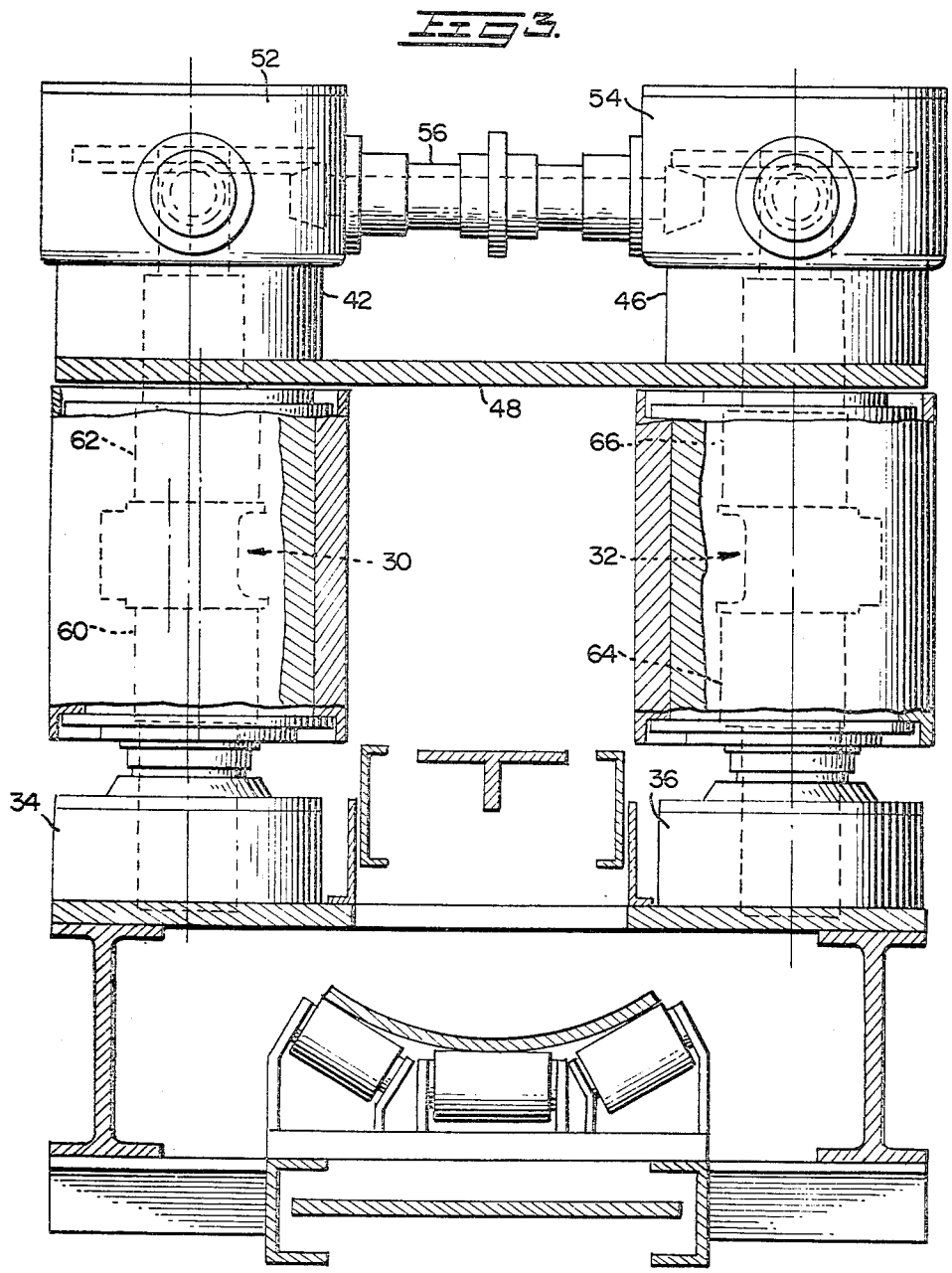

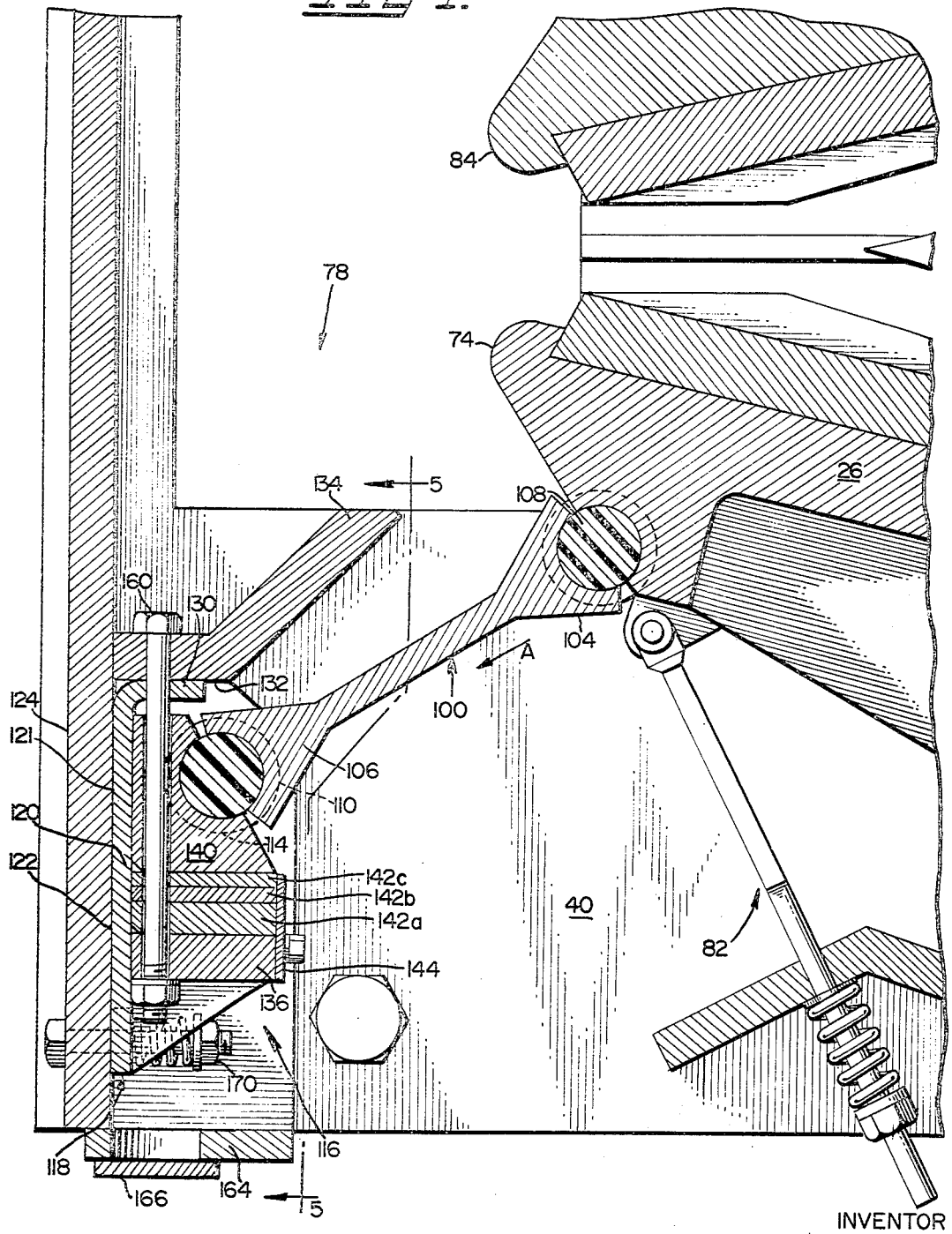

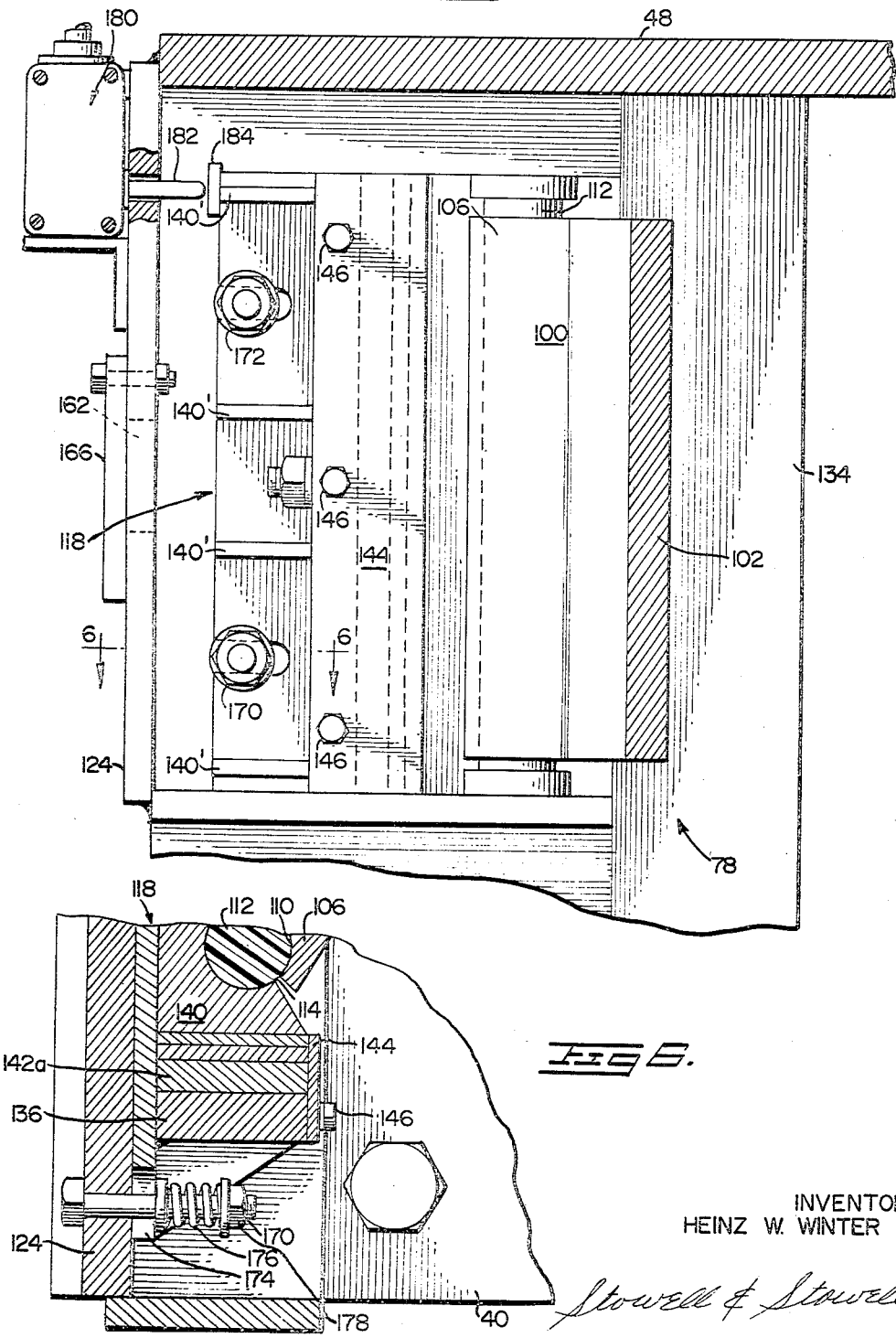

United States Patent Office 3,479,904
Patented Nov. 25, 1969

3,479,904
TOGGLE LINK MOUNTING MECHANISM
Heinz W. Winter, Salt Lake City, Utah, assignor, by mesne assignments, to Envirotech Corporation, Salt Lake City, Utah, a corporation of Delaware
Filed July 12, 1968, Ser. No. 747,768
Int. Cl. G05g 1/04
U.S. Cl. 74—520                              5 Claims

ABSTRACT OF THE DISCLOSURE

A slide block is provided to mount one end of a toggle link and the slide block is immobilized by a rupturable element the size of which is kept to a minimum as a substantial portion of the thrust tending to move the slide block is resisted by friction between an extended surface of the slide block and a rigid housing therefor.

BACKGROUND

It has been the practice in industry to mount the non-driven end of movable jaws of jaw crushers by means of a toggle link assembly whereby the non-driven end may oscillate, or orbit in synchronism with the driven end of the jaw so that the effective crushing action of the jaw or jaws of the crusher are relatively uniform throughout the crushing zone. It has also been the practice to so construct the toggle link mechanism that upon overload conditions, within the jaws of the crusher, a portion of the toggle link mechanism will rupture or mechanically fail thereby permitting the crusher mechanism to be stopped with relatively little damage to the operating mechanism. Generally the rupturable portion of the toggle link is the link itself and while the expensive operating mechanism of the jaw crusher is saved considerable time and effort have been required to replace the broken or ruptured toggle link.

THE PRESENT INVENTION

The present invention is directed to an improved mounting for a toggle link wherein a substantial portion of the thrust placed upon the link is resisted by frictional engagement between mounting means for one end of the link and a rigid frame structure whereby the mounting means may be secured to its housing by a relatively small rupturable element such as a bolt which ruptures upon overload conditions permitting the mounting element for one end of the toggle link to freely slide thus relieving overload conditions within the jaws of the crusher. Replacement of the ruptured bolt or the like is relatively quick and inexpensive.

Further substantial control of the force required to rupture the rupturable holding means is obtainable by merely enlarging or decreasing the diameter of the rupturable holding member.

These and other objects of the present invention are provided by mounting means for one end of a toggle link comprising a bearing block shaped to receive said one end of the toggle link, the bearing block having an extended bearing surface positioned at an angle less than 90° to the line of thrust of the toggle link, a fixed bearing surface upon which the bearing surface of the bearing block may slide, and rupturable means normally connecting said bearing block to said fixed bearing surface.

Similar subject matter is disclosed in my application Serial No. 747,766 filed even date herewith entitled "Jaw Crusher and Feed Mechanism Therefor."

The invention will be more particularly described in reference to the accompanying drawings wherein:

FIGURE 1 is a side elevational view of a horizontal flow jaw crusher and feeder mechanism embodying the improved toggle link mounting means of the invention;

FIGURE 2 is a section of the operating portion of the jaws of the crusher of FIGURE 1 substantially on line 2—2 thereof;

FIGURE 3 is a section on line 3—3 of FIGURE 2 with portions broken away to more clearly show the eccentric drive means for the crusher jaws;

FIGURE 4 is an enlarged fragmentary horizontal sectional view of the toggle link mechanism illustrated in FIGURE 2;

FIGURE 5 is a view substantially on line 5—5 of FIGURE 4; and

FIGURE 6 is an enlarged fragmentary view substantially on line 6—6 of FIGURE 5.

Referring to the drawing and in particular to FIGURES 1, 2 and 3, 10 generally designates an improved crusher embodying the principles of the present invention. The crusher 10 is mounted for mobile operation on a main frame 12 supported on rear wheels 14 and steerable front wheels 16. The crusher per se is generally designated 18 and is mounted on the bed of the main frame 12 for horizontal flow of material to be crushed through the crusher jaws as more fully described in my said co-pending application.

Reciprocating feeder mechanism generally designated 20 is mounted to urge material to be crushed into the crusher jaws. Above the feeder mechanism 20 is a fixed supply hopper generally designated 22 which is carried by the main frame via a plurality of generally vertically extending support members 24.

The crusher per se consists of a pair of crusher jaws 26 and 28 eccentrically mounted on a pair of drive shafts 30 and 32 respectively. The drive shafts 30 and 32 have their lower ends mounted in fixed bearing members 34 and 36 supported by a bottom plate 40 for the crusher. The upper ends of the shafts 30 and 32 are mounted in similar bearing members 42 and 46 mounted on a top plate 48 of the crusher main frame. Drive means consisting of a pair of motors 50, only one of which is illustrated in the drawing, have their output shafts connected to conventional gear means maintained in gear boxes 52 and 54. In order to synchronize the operation of the jaws a cross shaft 56 connects the primary drive gears within the gear boxes 52 and 54.

Each of the shafts 30 and 32 is provided with an eccentric off-set bearing portion 60 and 62 for shaft 30 and 64 and 66 for shaft 32 which eccentric portions engage, through suitable bearing means not shown, the barrel portions 70 and 72 of the crusher jaws. The extended cantilevered portions 74 and 76 of the jaws 26 and 28 of the crusher are mounted for eccentric motion created by rotation of the shafts 30 and 32 in toggle link mechanisms generally designated 78 and 80. Further as illustrated more clearly in FIGURE 2 the extended ends 74 and 76 of each of the jaws 26 and 28 is urged into the open position via spring urged biasing means 82 and 84.

Each of the toggle link mechanisms for supporting the forward cantilevered ends of the jaws of the crusher are identical in form and only unit 78 will be described in detail in reference to FIGURES 4 and 5 of the drawings. The toggle link mechanism 78 and mounting means therefor includes a toggle link 100 which is forged or cast with a plate like body portion 102 and a pair of flared end portions 104 and 106. End 104 is shaped to provide a generally hemi-cylindrical bearing surface which mates with a cylindrical bearing member 108. In one embodiment of the invention the cylindrical bearing 108 comprises nylon.

The forward end 74 of the jaw 26 of the crusher is similarly machined or shaped to provide a hemi-cylindrical bearing pocket and retains the other portion of the cylindrical bearing rod 108. The opposite end 106 of the toggle link 100 is similarly machined or shaped to provide a hemi-cylindrical bearing pocket 110 and a cylindrical bearing 112 which may be identical with cylindrical bearing pocket 110. The cylindrical bearing 112 is maintained in a hemi-cylindrical bearing pocket 114 formed in a normally immobile slide block generally designated 116. The slide block 116 includes a generally L-shaped plate member 118 having an extended leg 120 with a flat surface 121 which contacts the flat surface 122 of the inner wall of the front plate 124 of the housing carrying the crusher mechanisms per se.

The small leg portion 130 of the L-shaped plate 118 is adapted to seat against face 132 of an angle support member 134 which is welded at its lower end to the upper surface of bottom plate 40 and at the top end to the under surface of the top plate 48.

A transverse wall member 136 is rigidly secured to the extended surface leg portion 120 and maintained rigidly thereon via a plurality of plates 140', as more clearly shown in FIGURES 4 and 6. The wall member 136 is generally parallel to the small leg 130 of the L-shaped plate 118. A bearing block 140 is received between the opposed faces of the small leg 130 and the transverse plate 136 and its position therebetween is varied by one or more of the shims 142a, b, and c, etc. which shims are held in their desired location by a cover plate 144 releasably secured to the transverse plate 136 by suitable cap bolts 146.

The entire slide bearing assembly 116 is maintained in the position illustrated, for example in FIGURE 4, by a rupturable long bolt 160 which passes through a bore in the vertically extending brace 134, a bore in the small leg 130 of the L-shaped plate 118 and similar bores in the bearing member 140, shims 142a, b, and c and transverse plate 136. The size of the single bolt 160 and its material of construction are so selected that upon overload conditions the bolt 160 will part permitting the entire slide block assembly to move away from vertical pillar or brace 134 and release the toggle link 100 to free its respective paw of the jaw crusher.

Once the bolt 160 has ruptured or parted the assembly is placed into operating condition by merely reinserting a new bolt. Reinsertion is relatively simply accomplished through a bore 162 in sidewall 164 of the crusher frame which bore 162 is provided with a removable cover plate 166. It will be recognized from the following discussion in reference to FIGURE 4 that the major thrust on the toggle link 100 is in the direction of directional arrow A which force tends to urge the surface 121 of the leg 120 of the L-shaped plate 118 into right frictional engagement with surface 122 of end wall 124 of the crusher housing. With the majority of the holding force being created by this frictional engagement only a minor portion of the retaining force is required of the bolt, 160. The amount of force transmitted to the bolt 160, relative to that employed in frictional engagement between the L-shaped plate and the end wall 124 is varied by the shims 142a, b, c, etc. which actually angularly space the bearing carrying member 140 of the assembly relative to the corresponding bearing 108 carried by the end 74 of the jaw 26.

In addition the shims 142a, b, c, etc. determine the amount and the form of the movement of the end 74 of its jaw 26 relative to the eccentric movement of the barrel portion 70 of the jaw created by the eccentric shaft 30. Preferably the end 74 of the jaw should have substantially the same movement as the opposite end of the jaw to insure relatively constant forces applied to material to be crushed as it flows generally horizontally through the jaws of the crusher.

In the illustrated form of the invention it will be noted that the slide block assembly 116 is maintained in its illustrated position by a pair of spring loaded tie-bolts generally designated 170 and 172. The bolts 170 and 172 pass through bores in the end wall 124 thence through slot like openings 174 in an edge portion of the long leg 120 of the plate 118. Helical springs 176, with suitable washers and nut means 178, resiliently hold or press the surface 121 of the large leg of the member 118 into frictional engagement with the inner surface 122 of the wall 124.

The spring pressing members 170 and 172 are not essential to the assembly, if the surface 121 is great enough or if the mating surface 121 and 122 are machined so that high frictional forces are created between the surfaces. Where the surfaces are not so machined slight warpage or unevenness reduces the frictional engagement and in such case the spring urged tie-bolts perform a useful function.

The assembly also includes a knock-off or cut-off switch assembly generally designated 180, FIGURE 5 of the drawing, having an actuator arm 182 positioned in contacting relationship with a plate 184 carried by the slide block 116 whereby if the bolt 160 ruptures permitting the slide block 116 to move laterally outwardly the knock-off switch 180 deenergizes the motors 50 permitting the crusher to be brought to a standstill.

From the foregoing description of an illustrated embodiment of the present invention it will be seen that improved mounting means for a toggle link has been provided. While the toggle link mounting means has been illustrated in relation to a jaw crusher it will be appreciated by those skilled in the art that the mechanism may be employed on various other types of machines where a toggle link of the overload release type may be required.

It will also be appreciated that while the slide block 116 has been illustrated as being formed of a plurality of elements the entire slide block could be readily cast as a single unit without loss of the majority of the advantages hereinbefore set forth.

It will also be appreciated that the rupturable bolt 160 may be replaced by an overload spring or a suitable hydraulic cylinder wherein the overload spring is sized or the pressure applied to the hydraulic cylinder is such that the slide-block 116 is normally maintained in its illustrated operative position. Upon overload conditions, the overload spring or the hydraulic cylinder permits the slide-block 116 to be urged laterally outwardly to relieve the forces on the toggle link 100.

I claim:

1. Releasable mounting means comprising a toggle link, a bearing block shaped to receive one end of the toggle link, said bearing block having an extended bearing surface position at an angle less than 90° to the line of thrust of the toggle link, a fixed bearing surface upon which the bearing surface of the bearing block may slide, and a rupturable bolt assembly normally maintaining said bearing block in fixed relation to said fixed bearing surface.

2. Releasable mounting means, a toggle link, a bearing block shaped to receive said one end of the toggle link, a slide block, an extended bearing surface on said slide block positioned at an angle less than 90° to the line of thrust of the toggle link, a fixed bearing surface upon which the extended bearing surface of the slide block is adapted to engage, means adjustably mounting the bearing block upon the slide block, and rupturable means normally maintaining the slide block in fixed relation to said fixed bearing surface.

3. The invention defined in claim 2 wherein the rupturable means comprises a bolt.

4. The invention defined in claim 2 wherein the means adjustably mounting the bearing block upon the slide block comprises shims.

5. The mounting means defined in any one of claims 1 and 2 including spring urged release means normally urging the extended bearing surface into frictional engagement with the said fixed bearing surface.

References Cited
UNITED STATES PATENTS

| | | | |
|---|---|---|---|
| 1,358,682 | 11/1920 | Rennerfelt | 241—32 X |
| 1,603,765 | 10/1926 | Haas et al. | 241—32 |

MILTON KAUFMAN, Primary Examiner

U.S. Cl. X.R.

241—32